United States Patent [19]
Tsuji et al.

[11] Patent Number: 5,969,794
[45] Date of Patent: Oct. 19, 1999

[54] CAMERA

[75] Inventors: Kenji Tsuji, Kashiwara; Yasuaki Serita; Hiroyuki Okada, both of Sakai, all of Japan

[73] Assignee: Minolta Co., Ltd., Osaka, Japan

[21] Appl. No.: 08/501,871

[22] Filed: Jul. 13, 1995

[30] Foreign Application Priority Data

Jul. 15, 1994 [JP] Japan .................................. 6-163569

[51] Int. Cl.[6] ............................ G03B 17/24; G03B 17/38
[52] U.S. Cl. ........................................... 354/106; 354/266
[58] Field of Search ................... 354/105, 106, 354/266

[56] References Cited

U.S. PATENT DOCUMENTS

| | | | |
|---|---|---|---|
| 4,639,111 | 1/1987 | Harvey | 354/106 |
| 4,780,735 | 10/1988 | Taniguchi et al. | 354/106 |
| 5,059,993 | 10/1991 | Harvey | 354/266 |
| 5,151,726 | 9/1992 | Iwashita et al. | 354/106 |
| 5,204,707 | 4/1993 | Harvey | 354/106 |
| 5,473,397 | 12/1995 | Miyamoto et al. | 354/106 |

*Primary Examiner*—A. A. Mathews
*Attorney, Agent, or Firm*—Burns, Doane, Swecker & Matthis, LLP

[57] ABSTRACT

A camera has a release button, a shutter which operates upon depression the release button, light emitting diode that emits light used to record information on the film, a power source, a switch that closes in response to the operation of the release button to provide power to the light emitting diode, the switch having a first contact point connected to the power source and a second contact point connected to the light emitting diode, and a selecting member movably supported between a first position at which the selecting member prevents the closing of the first and second contact points and a second position at which the selecting member does not prevent the closing of the first and second contact points.

12 Claims, 9 Drawing Sheets

CAMERA

BACKGROUND OF THE INVENTION

1. Field of the Invention

The present invention pertains to a camera in which one of multiple photo frame formats may be designated as the print mode during photo-taking, and more particularly, to a camera in which format information corresponding to the print mode designated during photo-taking is recorded on the film using an optical signal.

2. Description of the Related Art

In recent years, a camera capable of photo-taking using as the photo frame format for printing one of two print modes, high vision format (H format) and panorama format (P format), has been considered.

In the camera described above, format information that indicates which of the two print modes was selected during photo-taking, so that appropriate photographic paper may be selected for printing, is recorded under the photo-taking screen (frame) of the film as optical data. At the processing laboratory, the printer is controlled based on this recorded data so that photographic paper of the size suitable for each photo frame format is selected and printing takes place.

FIG. 7 shows a conceivable construction used to record format information for said two types of print modes in the area of the film where the data recording should occur.

FIG. 7 shows important components inside the camera. Film 1 is pulled out of cartridge 5 inside the camera and wound onto spool 6 as photo-taking progresses. Plate member 37 and light emitting diode (LED) 39 are located at data recording position 35 located at the lower right of frame 25 to record format information. Plate member 37 has light passage hole 38 formed in it such that the light emitted from LED 39 passes through it.

A mode selecting member on the camera main unit selects the print mode. This mode selecting member and the ON/OFF switch for the circuit for LED 39 are connected. In other words, the print mode selected by means of the mode selecting member and the condition of LED 39 (whether it is ON or OFF) when the shutter is released are related as shown in Table 1 below. In this way, the format information corresponding to the print mode is recorded at the lower right of each frame at the same time that photo-taking takes place.

TABLE 1

| Selected print mode | LED 39 | Format information |
|---|---|---|
| H format | OFF | No dot points |
| P format | ON | One dot point |

FIG. 8 shows a block diagram of said control operation. The turning ON and OFF of switch 390 is linked with the release button for shutter release, and the turning ON and OFF of switch 391 is linked with the mode selecting member to select the print mode.

Specifically, switches 390 and 391 are grounded on one end and are connected to OR circuit 392 on the other end. Pull-up resistances 393 and 394 are connected to the lines from switches 390 and 391 to OR circuit 392, said resistances being further connected with power source VDD. LED drive unit 395 controls the LED such that it emits light when the signals input from OR circuit 392 have changed from 'High' to 'Low'. In said control circuit, when switches 390 and 391 are OFF, 'High' signals are output from OR circuit 392 at all times, and 'Low' signals are output from OR circuit 392 only when switches 390 and 391 are both turned ON. Therefore, the LED emits light and one dot point is recorded only when switches 390 and 391 are both turned is ON.

In the camera described above, two switch mechanisms are used as shown in FIG. 8. In recent years, as electronization of cameras has become advanced, even if two switch mechanisms are used, as long as one or both of said switches are constructed using electronic circuits, the reliability of the camera is not significantly compromised.

However, in inexpensive cameras such as those using 'film with an attached lens' (so-called disposable cameras), the use of which has rapidly increased in recent years because of their convenience, because mechanical switches having a simple mechanism are used, two switch mechanisms mean that two areas can cause a bad connection, etc., which is a major factor in reducing their reliability.

In particular, where a bad connection occurs with switch 390 linked to the release button, the camera does not operate and the user therefore can easily perceive the occurrence of a failure, but where a bad connection occurs with switch 391 linked to the switching of the mode, the failure cannot be perceived easily and the user may continue using the camera.

SUMMARY OF THE INVENTION

The present invention was made in consideration of the above problem. Its object is to provide a camera in which the recording of format information is controlled using multiple electric switch mechanisms and in which the number of areas that may cause failure such as through a bad connection is reduced, therefore increasing reliability, by decreasing the number of switch mechanisms controlling opening and closing of the light emitting circuit based on the contact/non-contact method.

The object of the present invention is achieved by providing a camera comprising a release button, a shutter which operates upon depression of said release button, a light emitting means that emits light used to record information on the film, a power source, a switch that closes in response to the operation of said operation means to provide power to said light emitting means, said switch having a first contact point connected to said power source and a second contact point connected to said light emitting means, and a selecting member movably supported between a first position at which said selecting member prevents the closing of said first and second contact points and a second position at which said selecting member does not prevent the closing of said first and second contact points.

Another object of the present invention is to provide a camera in which the occurrence of failures that cannot be easily perceived by the user is prevented.

Yet another object of the present invention is achieved by providing a camera comprising a release button, a shutter which operates upon depression of said release button, a light emitting means that emits light used to record information on the film, a power source, a switch that closes in response to the operation of said operation means to provide power to said light emitting means, said switch having a first contact point connected to said power source and a second contact point connected to said light emitting means, and a selecting member movably supported between a first position at which said selecting member shields light between the film and said light emitting means and a second position at which said selecting means does not shield light between the film and said light emitting means.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Embodiments of the present invention are described below with reference to the drawings. In the embodiments described below, a situation in which the two types of selectable print modes are H format and P format will be explained.

Figure 1:
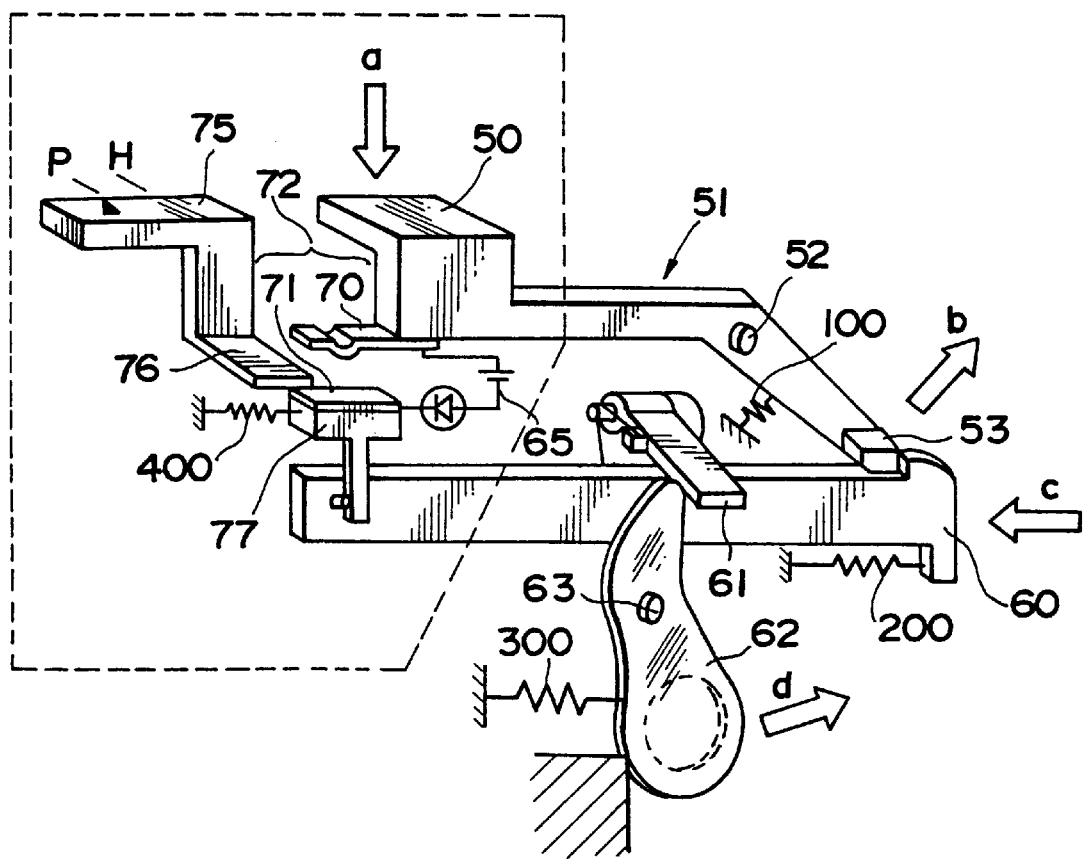
FIG. 1 is a simplified drawing to explain the method of recording format information in the camera of a first embodiment of the present invention.

FIG. 1 shows a first embodiment of the present invention. In FIG. 1, only the main components of the camera of the present invention are shown, and light emitting circuit 65 is symbolically drawn. When release button 50 is pressed (arrow a), arm member 51 rotates around shaft 52, as a result of which tip 53 of arm member 51 moves upward against the force of spring 100 (arrow b) and is disengaged from shutter charge plate 60. Shutter charge plate 60 is pulled by the force of spring 200 and moves toward the left in the drawing (arrow c). When this happens, shutter striking piece 61 attached to shutter charge plate 60 strikes the top of shutter spring 62 and shutter spring 62 rotates around shaft 63 (arrow d), whereby the shutter opens, exposing the film, and photo-taking is accomplished. When shutter striking piece 61 passes, shutter spring 62 returns to the original position via the force of spring 300, and the shutter closes.

The camera of the present invention has light emitting circuit 65 to record said format information on the film. Switch mechanism 72 that opens and closes light emitting circuit 65 is located under release button 50. Switch mechanism 72 comprises movable piece 70 attached to the lower end of release button 50 and movable piece 71 attached to moving member 77 located near the lower end of release button 50. Moving member 77 and movable piece 71 move to the left by means of spring 400 when shutter charge plate 60 moves to the left in the manner described above based on the release operation.

Figure 7:
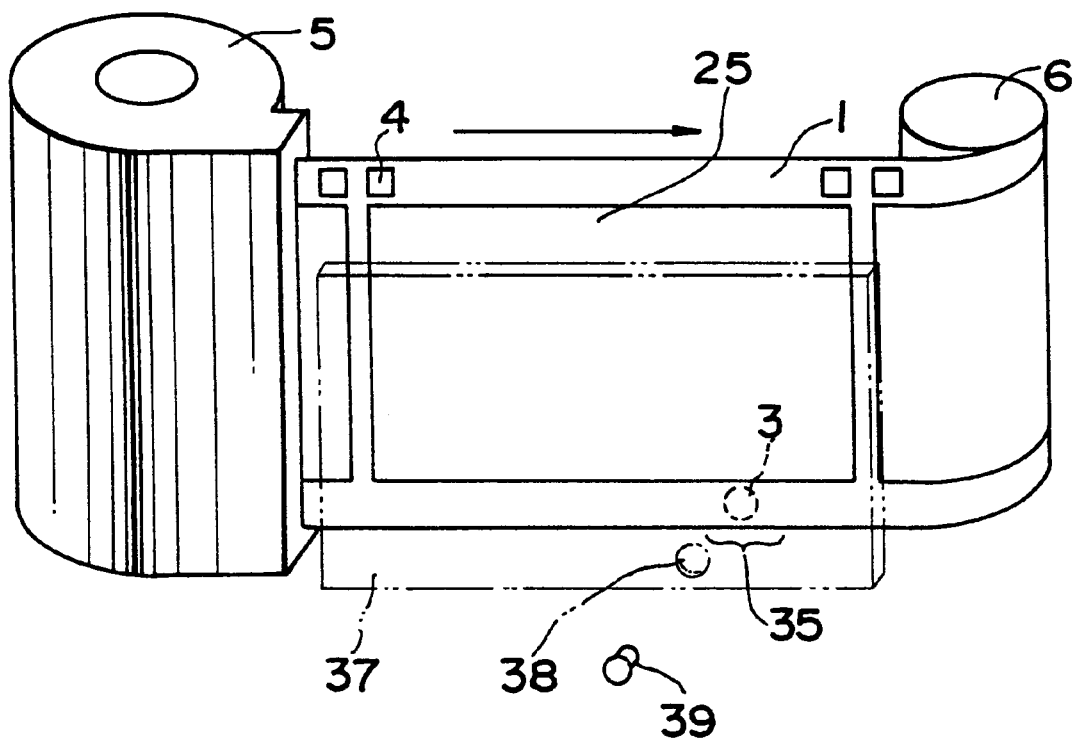
FIG. 7 is a simplified drawing showing a conventional construction to record two types of format information on the film.

When release button 50 is pressed to release the shutter, movable pieces 70 and 71 come into contact, whereby light emitting circuit 65 closes. LED 39 emits light when this happens and one dot point is recorded at recording position 35 of the film (see FIG. 7), whereby format information corresponding to the P format is recorded as shown in Table 1. The size of movable piece 71 and the velocity of moving member 77 are set such that LED emits light only for a prescribed time (e.g., 30 m/sec.). This occurs only when mode selecting member 75 is at the P position, as can be seen from FIG. 1. Mode selecting member 75 is exposed above the camera main unit. One of the two print modes, H format or P format, can be manually selected during photo-taking by placing a triangular arrow drawn on mode selecting member 75 to the position of H or P.

If mode selecting member 75 is slid from the P position shown in FIG. 1 to the right to the H position, tip 76 of mode selecting member 75 becomes positioned between movable pieces 70 and 71, and even if release button 50 is pressed, movable pieces 70 and 71 do not come into contact. As described above, when mode selecting member 75 is at the H position, light emitting circuit 65 is not closed even if release button 50 is pressed. Therefore, a dot point is not recorded in recording position 35 (see FIG. 4), and the format information becomes suitable for the H format as shown in Table 1.

Figure 2:
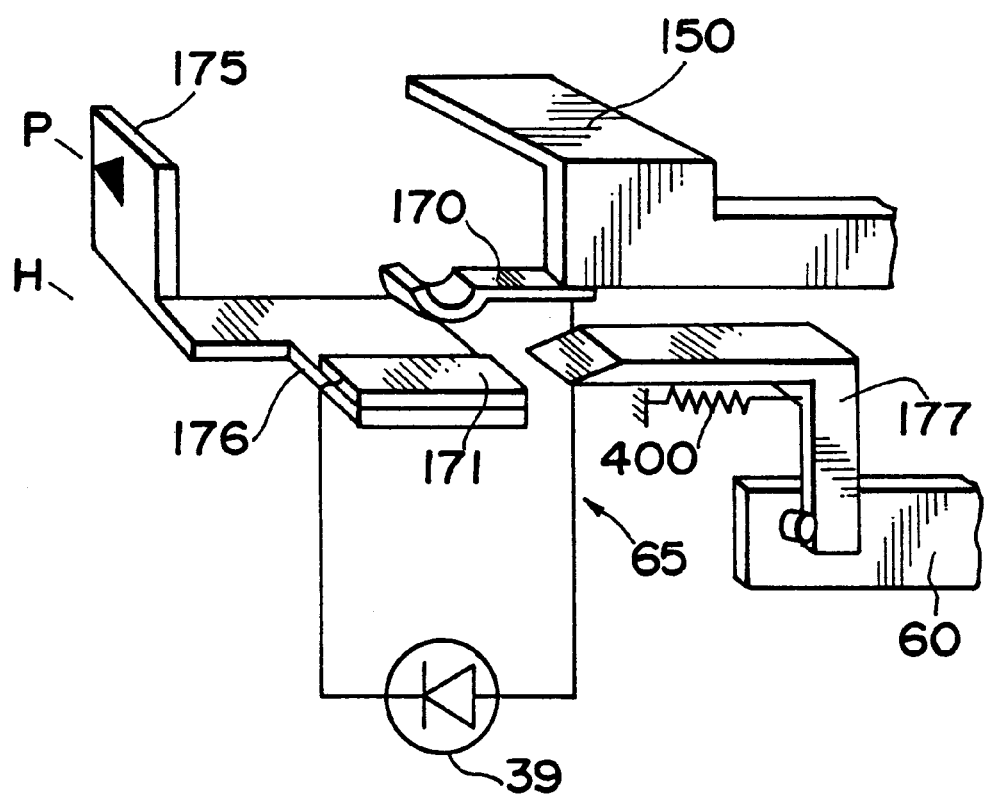
FIG. 2 is a simplified drawing to explain the method of recording format information in the camera of a second embodiment of the present invention.

FIG. 2 shows a second embodiment of the present invention. It shows only the part corresponding to that surrounded by a dotted line in FIG. 1. Other parts have the same constructions as those shown in FIG. 1. In the first embodiment shown in FIG. 1, when mode selecting member 75 is positioned at the H position, movable pieces 70 and 71 of switch mechanism 72 are prohibited from coming into contact by tip 76 of mode selecting member 75, which comes between said movable pieces. In the second embodiment shown in FIG. 2, on the other hand, the construction is such that fixed piece 171 is attached to tip 176 of mode selecting member 175, and when mode selecting member 175 is at the H position, movable piece 170 does not reach fixed piece 171 even if release button 150 is pressed to release the shutter, which prohibits movable piece 170 and fixed piece 171 from coming into contact. In the construction of the first embodiment shown in FIG. 1, mode selecting member 75 can be mounted such that it slides horizontally, whereas in the construction of the second embodiment shown in FIG. 2, mode selecting member 175 is mounted such that it slides vertically.

In this second embodiment as well, the LED is controlled such that it emits light for a prescribed period of time during photo-taking using the P format. This control operation is performed, as shown in FIG. 2, by having a construction in which moving member 177 moves to the left via spring 400 and comes between the two pieces when shutter charge plate 60 moves to the left in the manner described above based on the release operation.

Figure 3:
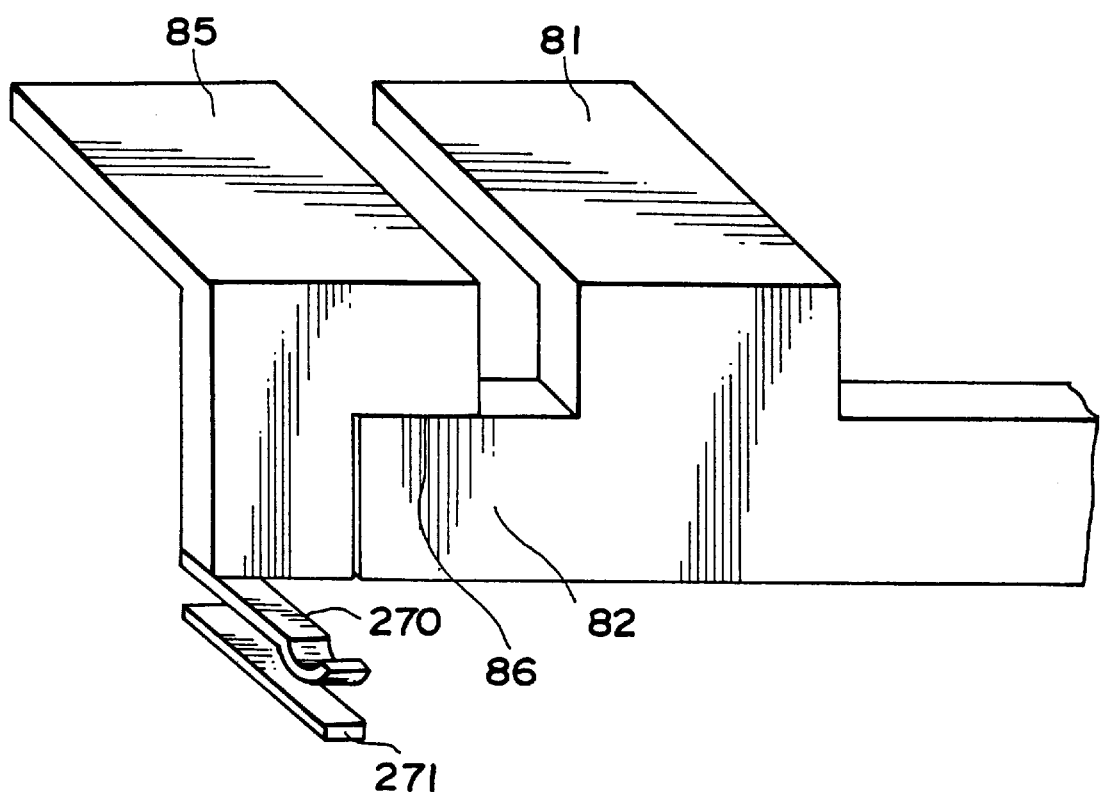
FIG. 3 is a drawing to explain a construction of a third embodiment of the present invention to record two types of format information, wherein a single switch mechanism is used.

FIG. 3 shows as a third embodiment a construction in which there is one switch mechanism for the selective recording of format information. Only the part corresponding to the part surrounded by the dotted line in FIG. 1 is shown in FIG. 3 as well. In the construction of the third embodiment shown in FIG. 3, a release button to perform photo-taking in the P format (hereinafter 'P button') and a release button to perform photo-taking in the H format (hereinafter 'H button') are formed separately. In other words, when H button 81 is pressed, the shutter is released in the same manner as in the first embodiment shown in FIG. 1 and the film is exposed, but because a movable piece is not attached to H button 81, light emitting circuit 65 does not close and no dot point is recorded. When P button 85 is pressed, on the other hand, because notch 86 formed on P button 85 engages with extension 82 formed on H button 81, causing H button 81 to also move downward, movable piece 270 attached to the lower edge of P button 85 and fixed piece 271 come into contact at the same time that the shutter is released and the film is exposed, whereby light emitting circuit 65 closes and one dot point is recorded.

Figure 4:
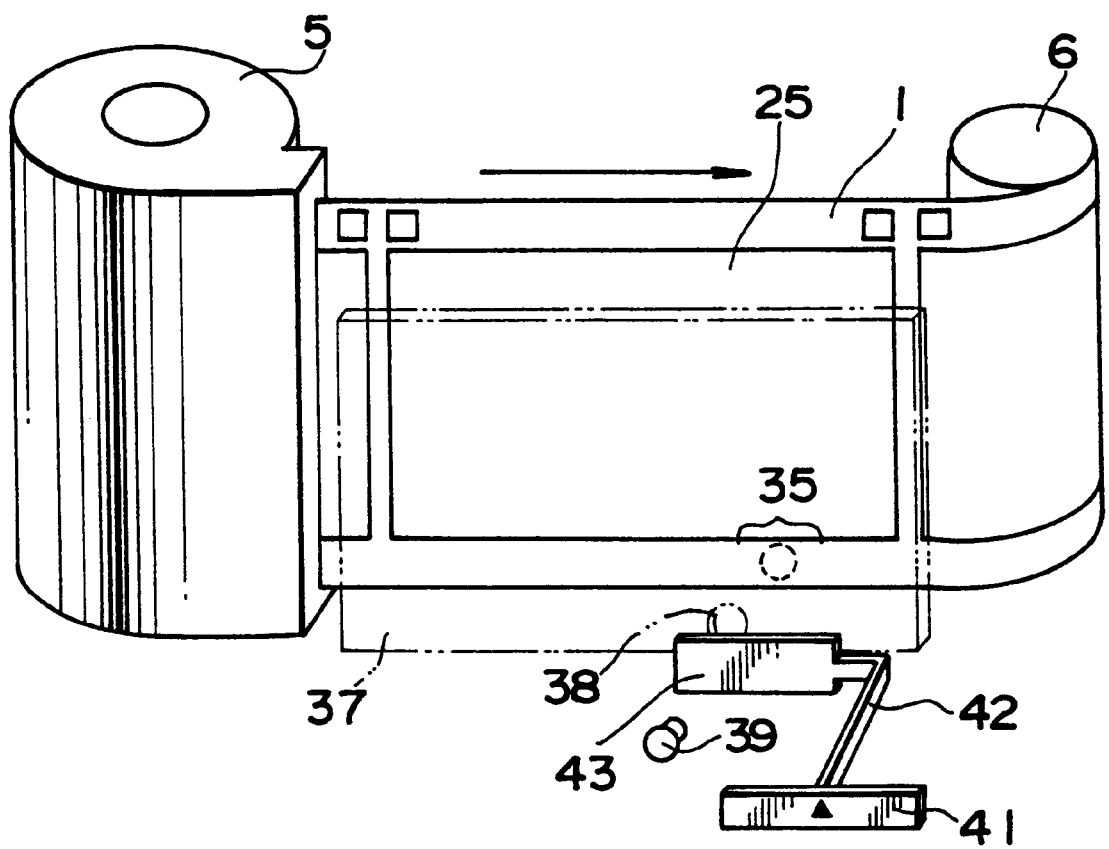
FIG. 4 is a drawing to explain a construction of a fourth embodiment of the present invention to record two types of format information, wherein a single switch mechanism is used.

FIG. 4 shows another construction as a fourth embodiment. In this construction, the number of switch mechanisms is reduced to one through the use of a shielding/non-shielding method vis-a-vis the light emitted from the LED, and not by causing the LED to emit or not emit light.

Shielding plate 43 that shields the light emitted from LED 39 is attached via lever 42 to mode selecting member 41 used to switch photo-taking from H format to P format and vice versa.

Figure 5A:
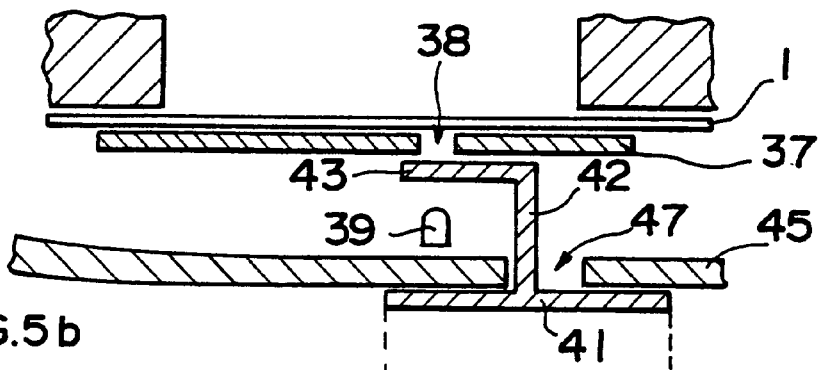
FIG. 5a is a cross-sectional view to explain the situation in which the H format is selected in the fourth embodiment of the present invention.
Figure 5B:
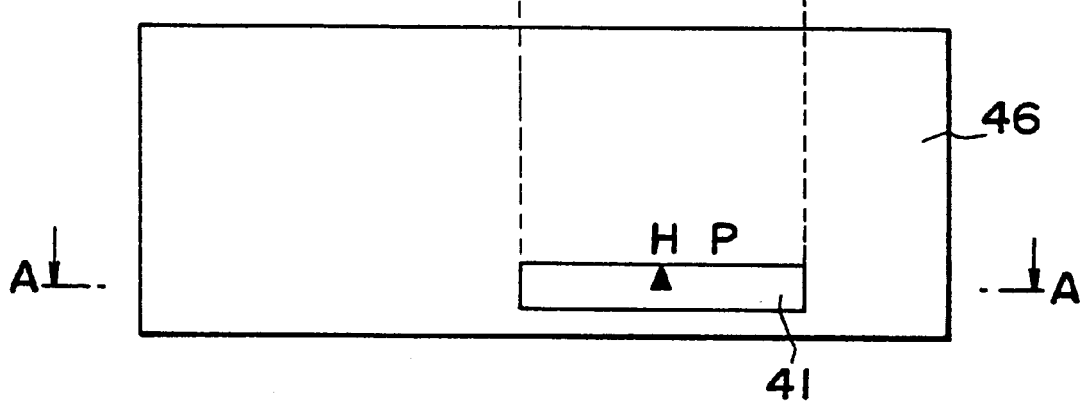
FIG. 5b is a rear elevation to explain the situation in which the H format is selected in the fourth embodiment of the present invention.
Figure 6A:
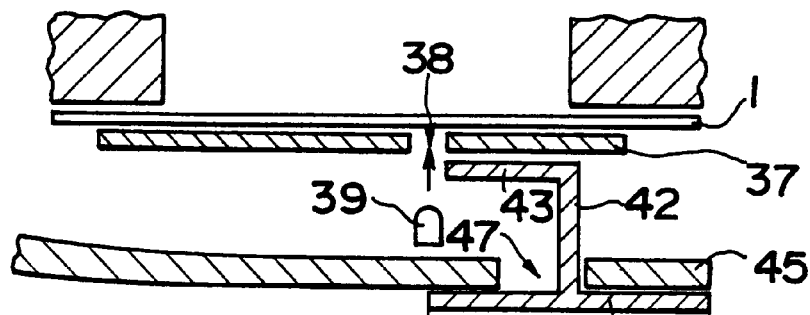
FIG. 6a is a cross-sectional view to explain the situation in which the P format is selected in the fourth embodiment of the present invention.
Figure 6B:
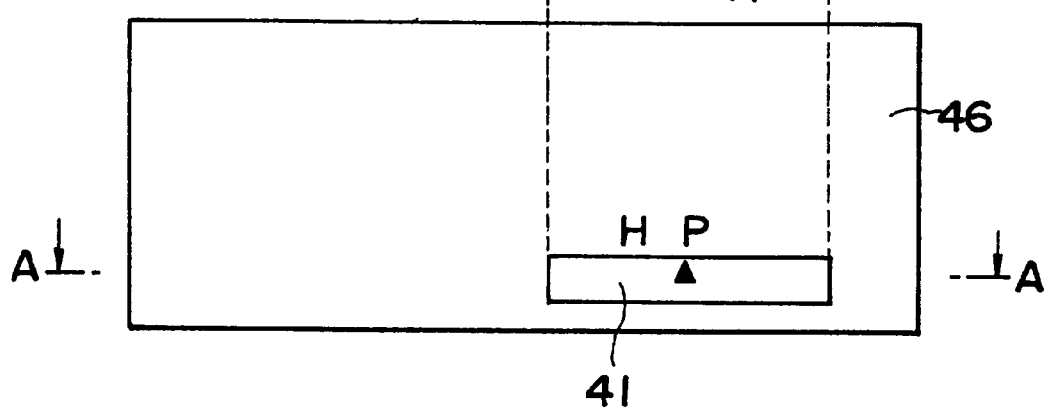
FIG. 6b is a rear elevation to explain the situation in which the P format is selected in the fourth embodiment of the present invention.

As to FIGS. 5a, 5b, 6a and 6b, FIGS. 5a and 6a show a cross-sectional view of the recording control unit while FIGS. 5b and 6b show important elements of camera rear surface 46. FIGS. 5a and 6a correspond to the cross-section at the A—A line in FIGS. 5b and 6b, respectively. FIGS. 5a and 5b show the situation in which the H format is selected as the print mode while FIGS. 6a and 6b show the situation in which the P format is selected as the print mode.

Figure 8:
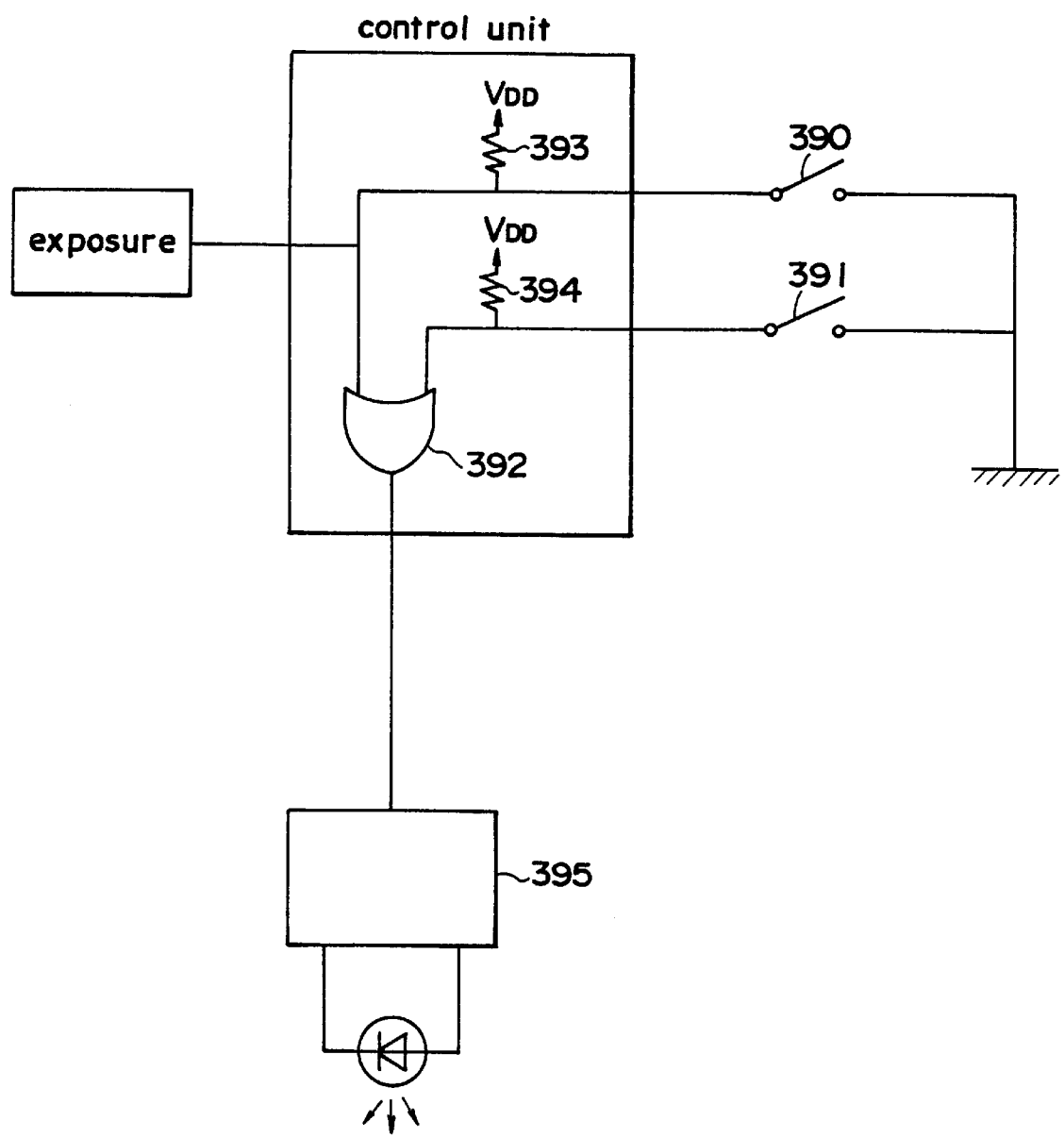
FIG. 8 is a block diagram showing the control method of the construction shown in FIG. 7.

In this construction, LED 39 does not have switch 391 as shown in FIG. 8. When the shutter is released, LED 39 always emits light for a prescribed period of time regardless of the print mode selected. However, as can be seen from FIGS. 5a, 5b, 6a and 6b, where H format is selected (the condition shown in FIGS. 5a and 5b), shielding plate 43 connected to mode selecting switch 41 covers light passage hole 38, so that even if LED 39 is emitting light, the light from it does not reach film 1 and no dot point is recorded. Conversely, where P format is selected (the condition shown in FIGS. 6a and 6b), light passage hole 38 is not covered by shielding plate 43 and is open. Therefore, when LED 39 emits light, the light emitted from it passes through light passage hole 38 and reaches film 1, whereby one dot point is recorded.

Figure 9:
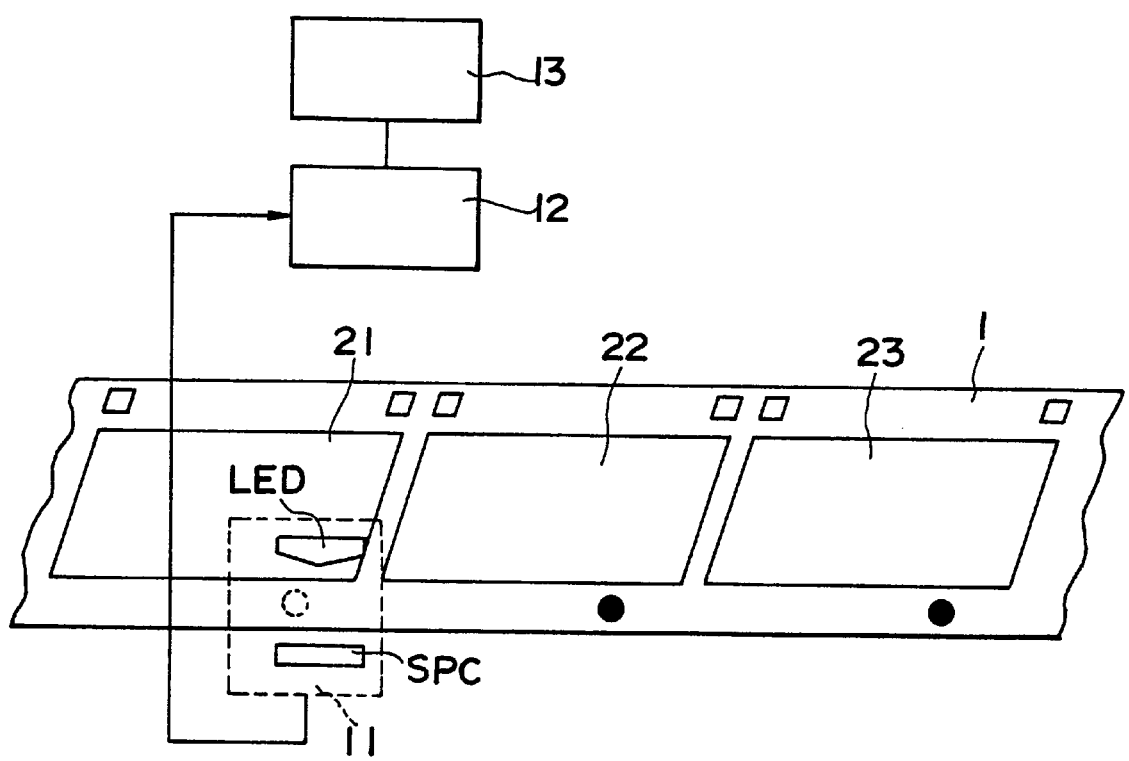
FIG. 9 is a simplified drawing showing a construction used to read format information in order to control a printer at a processing laboratory.

The processing laboratory performs printing in accordance with each print mode, because of which it is necessary to control the printer based on said format information. FIG. 9 shows a simplified construction of the data reader for this purpose. Data detector 11 comprises a light emitting element (LED) and a photoreceptor element (SPC). Since the light emitted from the LED reaches the SPC after passing through the recording position, the light reaching the SPC varies in response to the dot pattern. As described above, there are two dot patterns, one of which corresponds to the H format and the other to the P format.

Data reader 12 reads the difference in the light received by the SPC and the printer controller 13 controls the printer based on the data thus read. In this manner, printing using the format suited to the print mode for each of the frame of film 1 takes place automatically.

Using the present invention, in a camera in which format information for two types of print modes is recorded, the number of switch mechanisms necessary to control the recording mechanism is reduced to only one. In other words, in conventional models a second switch mechanism that worked in linkage with the mode selecting member has been used in addition to the first switch mechanism that worked in linkage with the release button. By comparison, in the present invention, a mode selecting means that selectively allows or prohibits the contact/non-contact of contact pieces in the first switch mechanism is employed in place of the second switch mechanism. Therefore, only one switch mechanism that controls the opening and closing of the circuit using the contact/non-contact of the contact pieces is needed.

Consequently, in the camera of the present invention, the risk of failing to record format information due to a bad connection, etc. of the switch mechanisms can be cut in half as compared with conventional models, in which two switch mechanisms are used.

In addition, because a switch mechanism is not used in a location such that a failure of the switch mechanism cannot be easily detected by the user, when a failure such as a bad connection occurs, the user can easily recognize the failure.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. Camera comprising:
   a release button;
   a shutter which operates upon depression of said release button;
   light emitting means for emitting light used to record information on the film;
   a power source;
   a switch that closes in response to the operation of said release button to provide power to said light emitting means, said switch having a first contact point connected to said power source and a second contact point connected to said light emitting means; and
   a selecting member movably supported between a first position at which said selecting member prevents the closing of said first and second contact points and a second position at which said selecting member does not prevent the closing of said first and second contact points.

2. Camera as defined in claim 1, wherein said selecting member includes an interrupt member that is inserted between said first and second contact points to prevent them from contacting when said selecting member is in said first position.

3. Camera as defined in claim 1, wherein said selecting member broadens a space between said first and second contact points in said first position and narrows the space between said first and second contact points in said second position.

4. Camera as defined in claim 1, wherein said selecting member selects said first position or said second position in response to a selection of a first print mode or a second print mode in which an image is printed from different respective areas of a film.

5. Camera comprising:

a shutter;

light emitting means for emitting light used to record information on the film;

a first operating member which operates said shutter without operating said light emitting means; and a second operating member different from said first operating member which operates both said shutter and said light emitting means.

6. Camera as defined in claim 5, further comprising:

a power source; and a switch which closes in response to the operation of said second operating member to provide power to said light emitting means, said switch having a first contact point connected to said power source and a second contact point connected to said light emitting means.

7. Camera comprising:

a release button;

a shutter which operates upon depression of said release button;

light emitting means for emitting light used to record information on the film;

a power source;

a switch which closes in response to the operation of said release button to provide power to said light emitting means, said switch having a first contact point connected to said power source and a second contact point connected to said light emitting means; and a selecting member movably supported between a first position at which said selecting member shields light between the film and said light emitting means and a second position at which said selecting means does not shield light between the film and said light emitting means.

8. Camera as defined in claim 7, wherein said selecting member selects said first position or said second position in response to a selection of a first print mode or a second print mode in which an image is printed from different respective areas of a film.

9. A camera comprising:

a shutter;

light emitting means for emitting light to record information on the film;

a first operating member that is manually operated by a user to operate said shutter; and a second operating member which actuates said first operating member to operate said shutter and which also actuates said light emitting means.

10. The camera of claim 9, wherein said first operating member is moved in a predetermined direction to operate said shutter and said second operating member is moved in said predetermined direction to actuate said light emitting means, and wherein said second operating member is disposed in an overlapping relationship with said first operating member such that movement of said second operating member in said predetermined direction causes movement of said first operating member to operate said shutter.

11. The camera of claim 9 wherein said first operating member comprise a manually actuated shutter release button which is connected to said shutter without being functionally connected to said light emitting means.

12. The camera of claim 11 wherein said second operating member comprises a manually actuated button which is functionally connected to both said shutter release button and to said light emitting means.

* * * * *